(12) United States Patent
Wegener et al.

(10) Patent No.: US 10,631,710 B2
(45) Date of Patent: Apr. 28, 2020

(54) DISPENSING DEVICE

(71) Applicant: Miele & Cie. KG, Guetersloh (DE)

(72) Inventors: Dirk Wegener, Bielefeld (DE); Fabian Hils, Delbrueck (DE); Florian Scharte, Harsewinkel (DE); Guenter Kroeger, Rahden (DE); Peter Nitsche, Beilngries (DE); Georg Spiessl, Altendorf (DE); Matthias Bauer, Schmidgaden (DE)

(73) Assignee: MIELE & CIE. KG, Guetersloh (DE)

( * ) Notice: Subject to any disclaimer, the term of this patent is extended or adjusted under 35 U.S.C. 154(b) by 717 days.

(21) Appl. No.: 15/361,023

(22) Filed: Nov. 24, 2016

(65) Prior Publication Data

US 2017/0143184 A1    May 25, 2017

(30) Foreign Application Priority Data

Nov. 25, 2015  (DE) ........................ 10 2015 120 400

(51) Int. Cl.
| | |
|---|---|
| *A47L 15/44* | (2006.01) |
| *D06F 39/02* | (2006.01) |
| *B65D 83/06* | (2006.01) |
| *G01F 11/00* | (2006.01) |
| *G01F 11/26* | (2006.01) |

(52) U.S. Cl.
CPC .......... *A47L 15/4409* (2013.01); *B65D 83/06* (2013.01); *D06F 39/026* (2013.01); *G01F 11/003* (2013.01); *G01F 11/261* (2013.01); *B65D 2255/20* (2013.01)

(58) Field of Classification Search
None
See application file for complete search history.

(56) References Cited

U.S. PATENT DOCUMENTS

| 4,141,311 A | 2/1979 | Taylor, Jr. |
| 2011/0247663 A1* | 10/2011 | Gadini ................ A47L 15/4454 |
| | | 134/115 R |

FOREIGN PATENT DOCUMENTS

| DE | 102013104391 A1 | 10/2014 |
| DE | 102013110403 A1 | 3/2015 |
| EP | 2772180 A2 | 9/2014 |

* cited by examiner

*Primary Examiner* — Michael E Barr
*Assistant Examiner* — Jason P Riggleman
(74) *Attorney, Agent, or Firm* — Leydig, Voit & Mayer, Ltd.

(57) ABSTRACT

A dispensing device for introducing a pourable detergent in metered amounts into a treatment chamber of a program-controlled cleaning appliance includes a housing provided with a loading aperture; a carrier unit rotatably mounted in the housing and accessible via the loading aperture and which serves to replaceably receive a supply container for holding the detergent; and a housing cover providing fluid-tight closure of the loading aperture. The housing cover includes a cover member providing the fluid-tight closure of the loading aperture and a locking member movably attached to the cover member, the locking member including a plurality of locking elements, each cooperating with a respective locking finger disposed on the housing.

14 Claims, 10 Drawing Sheets

DISPENSING DEVICE

CROSS-REFERENCE TO PRIOR APPLICATION

Priority is claimed to German Patent Application No. DE 10 2015 120 400.2, filed on Nov. 25, 2015, the entire disclosure of which is incorporated by reference herein.

FIELD

The present invention relates to a dispensing device for introducing a pourable detergent in metered amounts into a treatment chamber of a program-controlled cleaning appliance, in particular a dishwasher, the dispensing device including a housing provided with a loading aperture, a carrier unit which is rotatably mounted in the housing and accessible via the loading aperture and which serves to replaceably receive a supply container for holding the detergent, and further including a housing cover for fluid-tight closure of the loading aperture.

BACKGROUND

Program-controlled cleaning appliances in general, and dishwashers in particular, are per se well known in the art and, therefore, need not be specifically described herein.

Cleaning appliances of type in question typically have a washing tub providing a treatment chamber, also called washing chamber. The treatment chamber is accessible to a user via a loading opening which can be closed in a fluid-tight manner by a pivotably mounted washing chamber door. During normal use, the washing tub serves to receive items to be washed which, in the case of a dishwasher, may be dishes, cutlery items and/or the like.

In order to apply wash water, also called wash liquid, to the items to be washed, the cleaning appliance has a spray device disposed inside the washing tub. This spray device generally provides rotatable spray arms, typically two or three such spray arms. During normal use, wash liquid is applied to the items to be washed by rotating spray arms.

In order to achieve optimized cleaning results, process chemicals are used which are delivered into the washing chamber during a cleaning operation. Typically, the process chemicals are added to the wash liquid. Such process chemicals may, for example, be detergents, which are added into the washing chamber of the cleaning appliance in a program-controlled manner at a particular time during the operational cycle of operation.

Detergents in liquid and solid form are known in the art. Solid detergents may be in form of pourable powders or so-called tabs; i.e., in tablet form. However, practice has shown that the comparatively best results can be achieved with pourable detergents in powder form.

When pourable detergents in powder form are used, the user must manually measure out the detergent each time before a cleaning cycle is started. For this purpose, a cleaning appliance typically has a supply container which is disposed on the inner side of the door and has to be charged with a manually selected amount of detergent. During operation, this supply container opens at a particular point in time during the wash cycle, allowing the detergent held in the supply container to be washed out by the wash liquid present in the washing chamber of the cleaning appliance.

To be able to store detergent for a plurality of wash cycles, avoiding the need to manually measure out detergent each time before a wash cycle is started, dispensing devices have been proposed, such as the one described in DE 10 2013 104 391 A1.

This known dispensing device has a replaceable supply container for storing an amount of detergent sufficient for a plurality of wash cycles. The supply container is rotatable within a housing about an axis of rotation. During a normal dispensing event, the supply container is rotated in a program-controlled manner. For this purpose, a motor-driven drive device is provided which, when operated, causes rotational movement of the supply container. In the process, the motor-driven drive device cooperates with a carrier unit which replaceably receives the supply container.

To allow the carrier unit provided by the housing to be loaded with a supply container, the housing is provided with a loading aperture. The carrier unit is accessible to a user via the loading aperture for removable placement of a supply container.

In order to close the loading aperture in a fluid-tight manner during operation, the housing has a housing cover which may, for example, be pivotably mounted to the housing and pivoted from a closed position to an open position and vice versa. When the housing cover is in an open position, a user can access the supply container accommodated in the carrier unit of the dispensing device.

To permit release of detergent, the supply container has a detergent outlet in the form of an opening. During operation, detergent is released in portions through this opening. Such a release of detergent occurs in response to a rotational movement of the supply container. Each 360° rotation of the supply container causes equal portions of detergent to be fed to the detergent outlet and released from there into the washing chamber of the cleaning appliance via an interposed channel system.

Dispensing devices of the aforedescribed type have proven practical in everyday use. Nevertheless, there is a need for improvement, particularly with respect to increased operational reliability. It is, therefore, an object of the present invention to improve a dispensing device of the above-mentioned type in a way that provides enhanced operational reliability because of the design.

SUMMARY

In an embodiment, the present invention provides a dispensing device for introducing a pourable detergent in metered amounts into a treatment chamber of a program-controlled cleaning appliance, the dispensing device comprising: a housing provided with a loading aperture; a carrier unit rotatably mounted in the housing and accessible via the loading aperture and which is configured to replaceably receive a supply container for holding the detergent; and a housing cover configured to provide fluid-tight closure of the loading aperture, the housing cover including a cover member providing the fluid-tight closure of the loading aperture and a locking member movably attached to the cover member, the locking member including a plurality of locking elements, each cooperating with a respective locking finger disposed on the housing.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
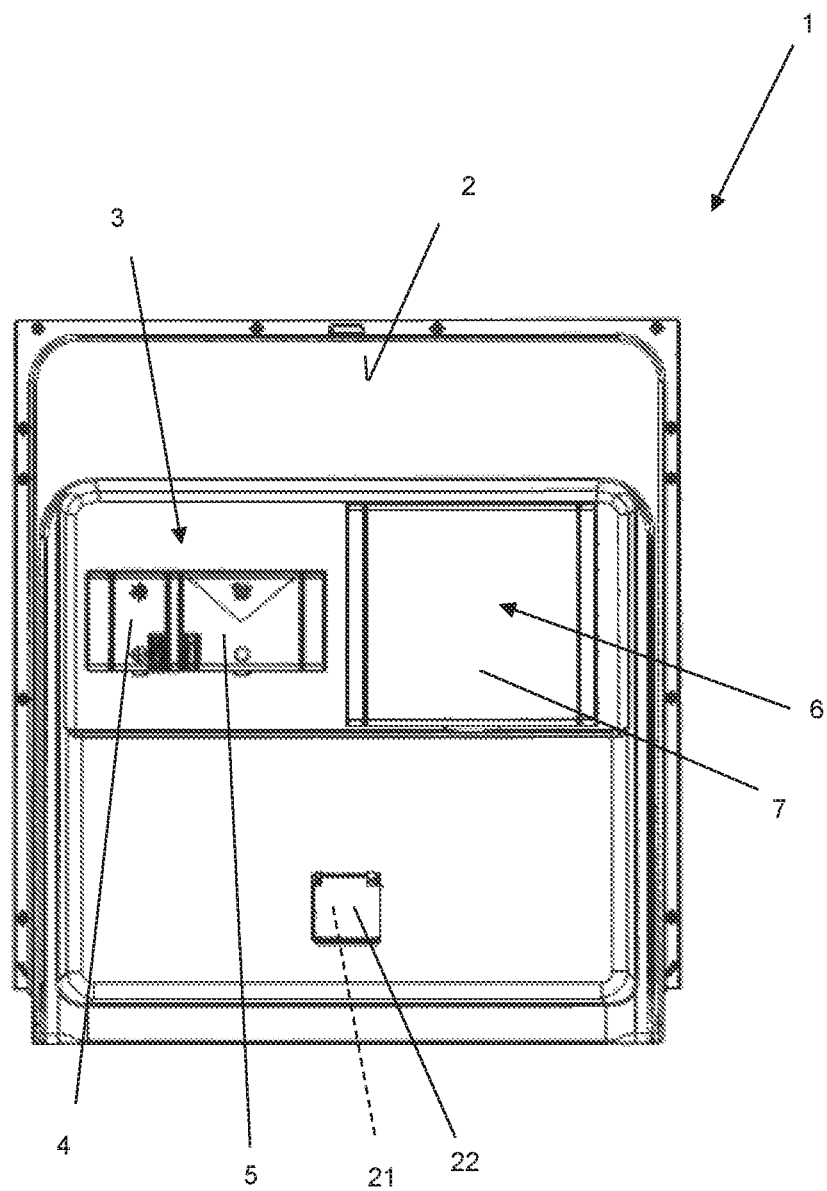
FIG. 1 is a schematic view of the inner side of a washing chamber door of a dishwasher.

In a departure from the prior art, the dispensing device according to the present invention does not have a housing lid formed as a single piece. Rather, a housing cover is provided which is formed in two parts. One part, namely the cover member, serves for fluid-tight closure, whereas the other part, namely the locking member, serves to fix and hold the cover member in its sealing position. This design provides for secure closure of the loading aperture, thereby preventing unwanted ingress of moisture into the housing. In this manner, the operational reliability is advantageously enhanced.

In accordance with the present invention, the locking member has a plurality of locking elements. Provided on the housing are correspondingly shaped locking fingers, the locking elements cooperating with the locking fingers when the housing cover is closed. By providing a plurality of locking elements, on the one hand, and locking fingers, on the other hand, a multi-point locking contact is achieved between the housing cover and the housing. Preferably, six or more, for example eight, such locking elements are provided, as well as a corresponding number of locking fingers. In this manner, a permanently reliable and fluid-tight engagement of the cover member on the housing is achieved.

In accordance with a further feature of the present invention, the housing cover has a hinged design. Via the hinge, the housing cover is pivotably mounted preferably to the housing, so that a user can access the loading aperture simply by pivoting the housing cover. In order to reclose the loading aperture, the housing cover has to be pivoted back to its closed position. Fluid-tight closure of the loading aperture by the cover member is not achieved until the locking elements provided by the locking member have been brought into cooperative contact with the locking fingers provided by the housing. Thus, the housing cover may be either in an open position or in a closed position, and when the housing cover is in the closed position, the locking member of the housing cover may be either in a locked position or in an unlocked position. In the locked position, the housing cover seals the loading aperture in a fluid-tight manner. In the unlocked position of the locking member, a user can move the housing cover from the closed position to its opening position.

In accordance with another feature of the present invention, the cover member is circular in shape. Accordingly, it has a geometry corresponding to the loading aperture. In the closed position of the housing cover, the cover member rests on the edge of the loading aperture.

The locking member is preferably rotatably attached to the cover member. Accordingly, a user can actuate the locking member by rotating it relative to the cover member.

In accordance with a further feature of the present invention, the locking member is annular in shape. In this case, a rotational movement for locking or unlocking the locking member is performed about an axis normal of the annular locking member, which makes it particularly easy to handle for the user.

Another feature of the present invention provides that the locking member surrounds the cover member annularly. Thus, the circular-shaped cover member carries the locking member at the edge, the locking member surrounding the cover member because of its annular shape. Preferably, to provide for guidance of the locking member relative to the cover member, a tongue-and-groove arrangement is provided, so that the annular locking member can be rotated about the cover member in the same plane.

Yet another feature of the present invention provides that the cover member is at least partially transparent or semi-transparent. This allows a user to look into the dispensing device through the cover member and the loading aperture, in particular to thereby check whether and to which extent the supply container accommodated in the housing of the dispensing device is still filled with a sufficient amount of detergent.

A further feature of the present invention provides that the cover member is made of plastic. It would also be conceivable to use glass instead of plastic, but plastic is preferred because of its low weight.

Another feature of the present invention provides that the cover member cooperates with a seal disposed on the housing. Alternatively, a seal could also be disposed on the cover member. In this connection, the design of the present invention has the particular advantage that the cover member is stationary relative to the seal during movement of the locking member from a locked position to an unlocked position or vice versa. In particular, no relative movement occurs between the seal and the cover member, so that the seal is not mechanically stressed by a moving locking member during unlocking or locking of the housing cover. Thus, the design of the present invention allows for a long life of the seal.

A further feature of the present invention provides that at least one of the locking element/locking finger arrangements forms a bayonet lock. In this manner, it is achieved, firstly, that during movement of the locking member from an unlocked position to a locked position, the cover member is pressed against the seal, whereby a fluid-tight engagement of the cover member is achieved. Secondly, the bayonet lock design prevents the locking member from being accidentally released simply by being turned back as a result of, for example, vibrations occurring during operation. Thus, the design of the present invention is particularly reliable in operation.

Overall, the design of the present invention is characterized by a housing cover sealing system that has a locking member which is in the form of a ring and is captively connected to the cover member, the bayonet ring having at least six, preferably eight, locking sections provided by locking elements in connection with respective retaining fingers on the housing. The closing forces are quite small because, unlike a screw cap, for example, no frictional forces occur between the cover member and the seal. The special insertion geometry between locking elements and locking fingers, embodied as a bayonet lock, ensures that the cover member is drawn onto the seal. Because of the preferably six to eight bayonet catches, it is possible to counteract temperature- or aging-related deformation of the housing cover over the long term, thereby ensuring a long-lasting sealing of the overall system.

In order to open the housing cover, the user must rotate the bayonet ring through, for example, 10°, which results in unlocking. Then, the housing cover; i.e., the cover member and the locking member attached thereto, must be rotationally pivoted about the hinge axis. The locking member, embodied as a bayonet ring, remains permanently on the cover member and, therefore, cannot be lost, even not when the housing cover is in the open position. Closing of the housing cover is performed in reverse order by moving the housing cover from an open position to a closed position and then rotating the locking member into its locked position. The unlocked and locked positions are preferably indicated to the user by respective symbols provided on the locking member and/or the cover member.

Figure 12:
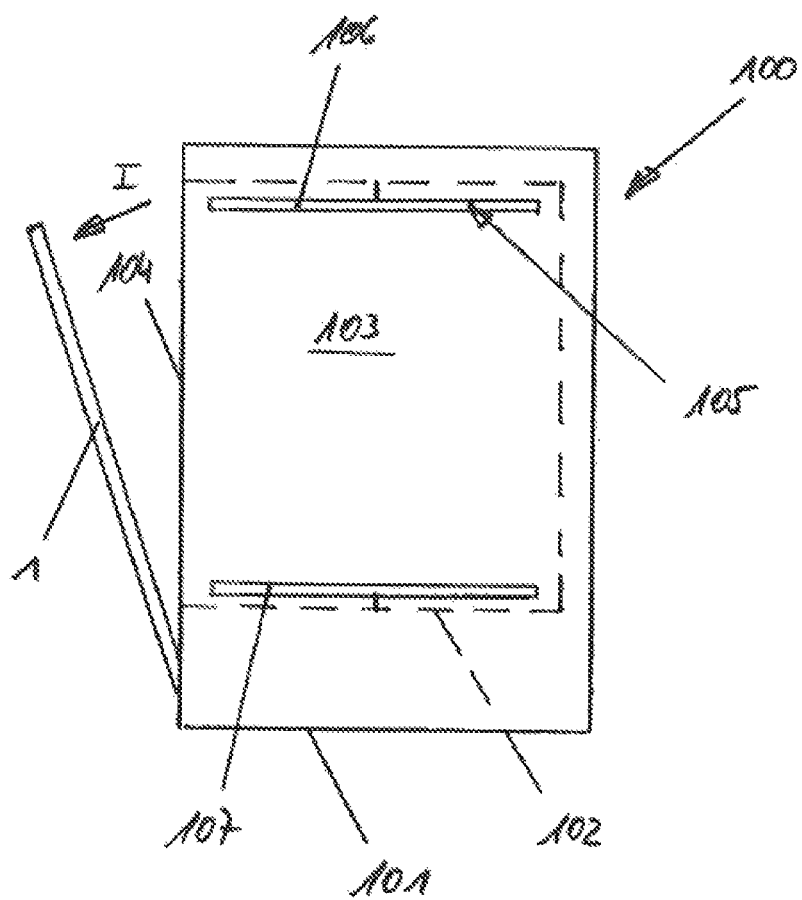
FIG. 12 is a schematic side view of a cleaning appliance.

FIG. 12 shows, purely schematically, a cleaning appliance in the form of a dishwasher 100.

In a manner known per se, dishwasher 100 has a housing 101 that accommodates a washing tub 102. Washing tub 102, in turn, provides a treatment chamber, also called washing chamber 103, to receive items to be washed. To permit loading of washing chamber 103 with items to be washed, washing tub 102 has a loading opening 104. Loading opening 104 can be closed in a fluid-tight manner by a washing chamber door 1, which is supported so as to be pivotable about a horizontally extending pivot axis.

During normal use, wash liquid is applied to the items to be washed. To this end, dishwasher 100 is provided with a spray device 105. In the exemplary embodiment shown, spray device 105 includes an upper spray arm 106 and a lower spray arm 107.

FIG. 1 shows washing chamber door 1 in elevation, looking at the inner side thereof in the direction of view denoted I in FIG. 12.

As can be seen from FIG. 1, washing chamber door 1 is provided on the inner side with a combination device 3 which is generally known in the art and which has a rinse aid reservoir 4 as well as a supply container 5 that has to be filled manually with detergent by a user for each wash cycle.

In addition to the combination device 3 generally known in the art, dishwasher 100 further has a dispensing device 6 which, like combination device 3, is disposed on inner side 2 of washing chamber door 1. When washing chamber door 1 is closed, housing cover 7 of dispensing device 6 is in the closed position, as shown in FIG. 1.

Figure 2:
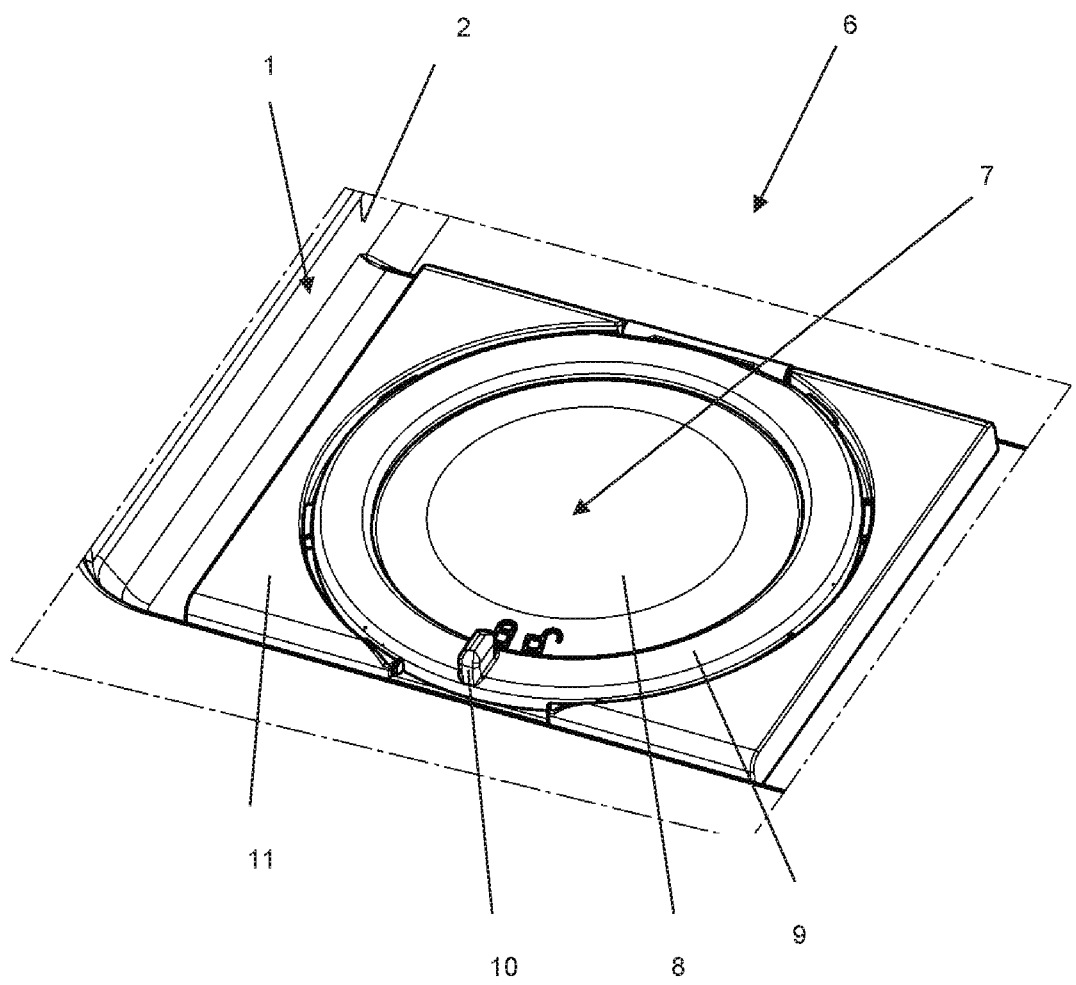
FIG. 2 is a schematic perspective detail showing a dispensing device according to the present invention from above, with a housing cover in a first position.
Figure 6:
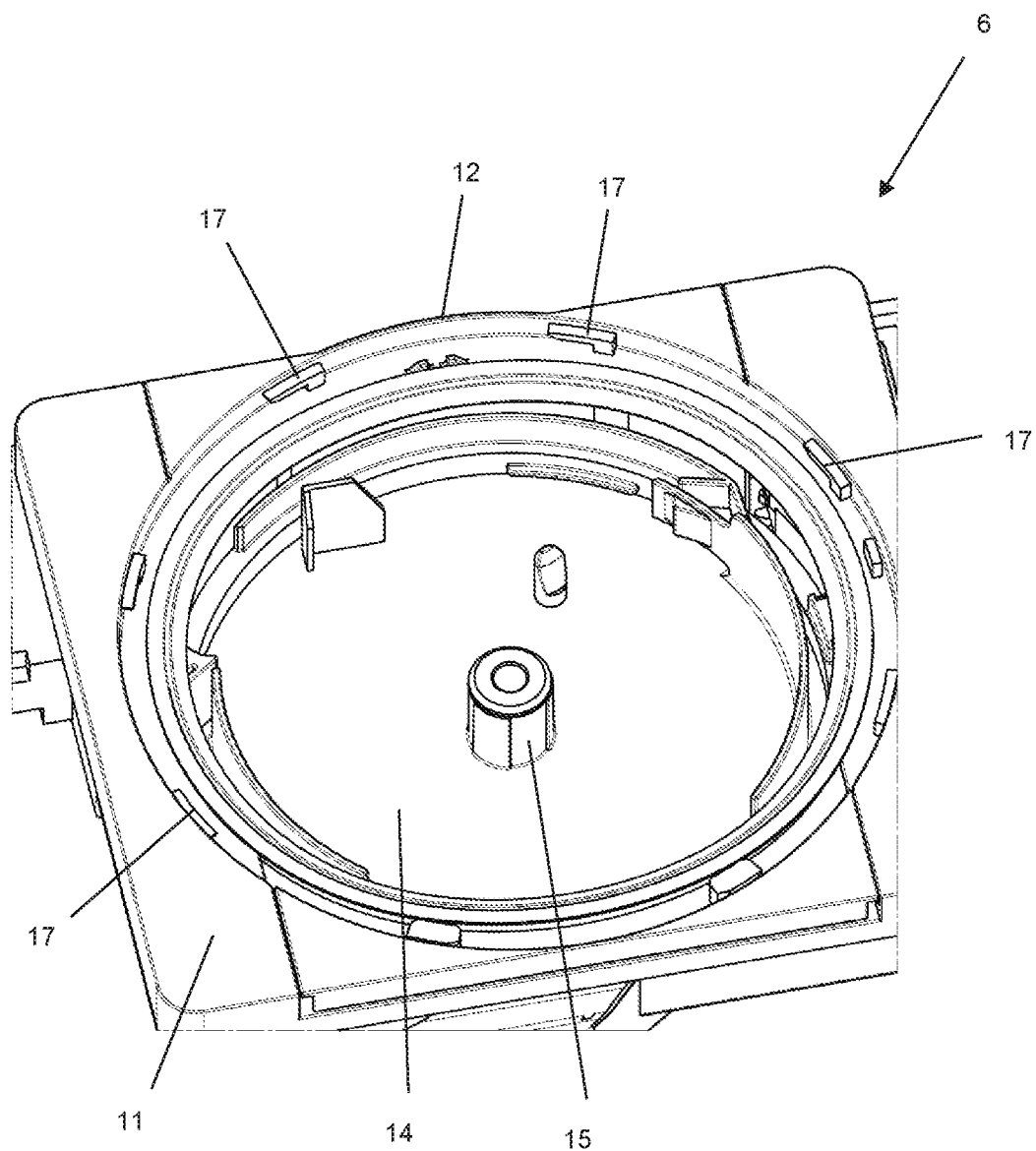
FIG. 6 is a schematic perspective detail view showing a dispensing device according to FIG. 2 without a housing cover.

As can be seen particularly when viewing FIGS. 2 and 6 together, dispensing device 6 has a housing 11. The housing is accessible via a loading aperture 12 which can be closed in a fluid-tight manner by housing cover 7.

Housing 11 accommodates a rotatably mounted carrier unit 14 which, when rotated, rotates about an axis of rotation provided by axle projection 15. Carrier unit 14 serves to receive a supply container 13 charged with detergent, as can be seen from the illustration in FIG. 3.

Figure 3:
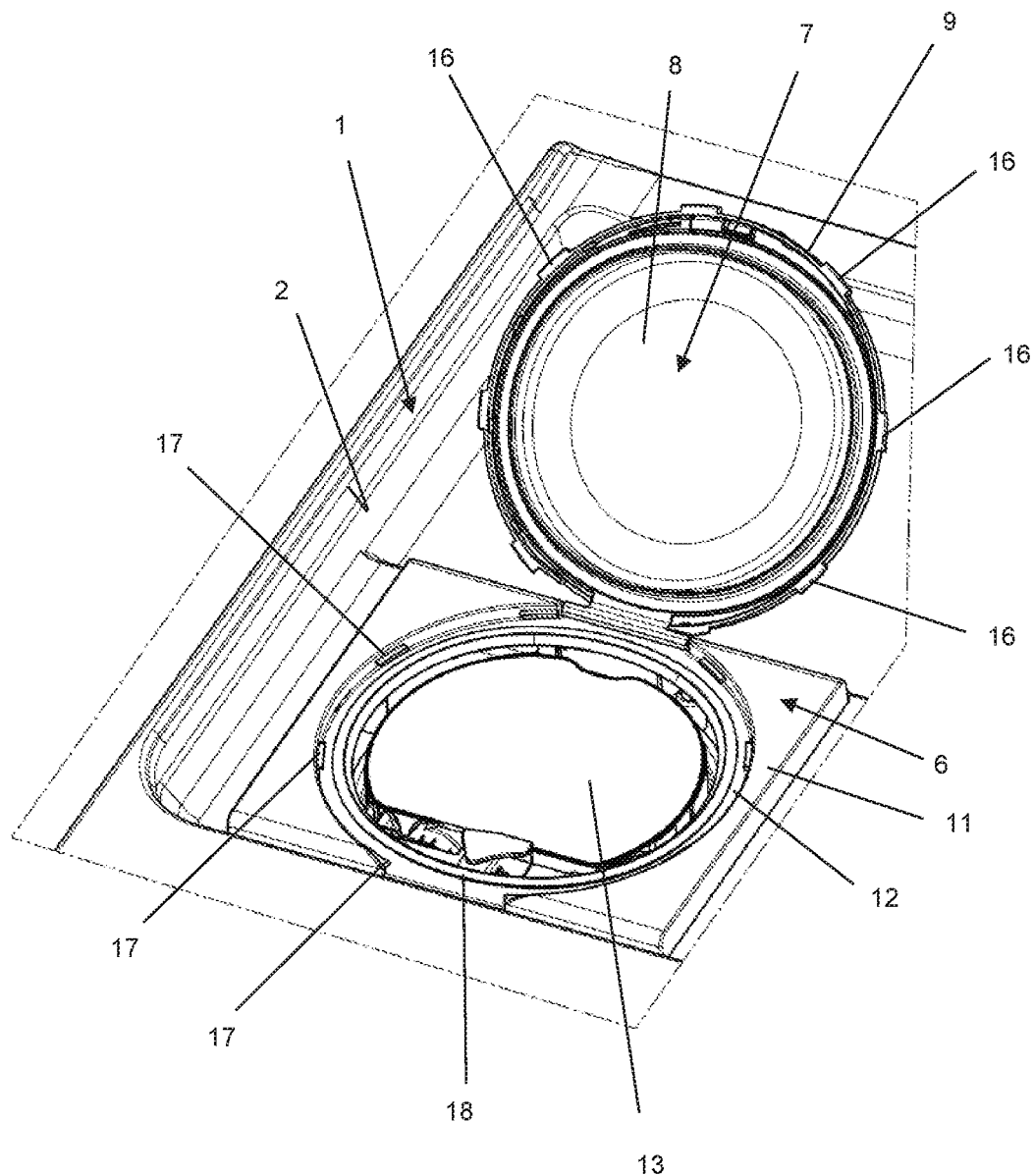
FIG. 3 is a schematic perspective detail view showing the dispensing device of FIG. 2 with a housing cover in a second position.

As can also be seen from FIG. 3, a user can access supply container 13 through loading aperture 12 only when housing cover 7 is in its open position, as shown in FIG. 3. In the closed position of housing cover 7, as shown, for example, in FIG. 2, a user cannot access supply container 13 received in carrier unit 14.

During a normal dispensing event, detergent is conveyed from supply container 13 into washing chamber 103 of dishwasher 100. To this end, a dispensing outlet 21 is provided on the inner side of the washing chamber door, as can be seen from the illustration in FIG. 1. This dispensing outlet 21 is equipped with a cover 22 or a pivoted cover.

Supply container 13 can be replaceably inserted by a user into carrier unit 14 of dispensing device 6. Carrier unit 14 holds supply container 13 in a non-rotatable manner, so that when carrier unit 14 is rotated in a powered manner, supply container 13 accommodated therein is rotated along with it, namely about the axis of rotation defined by axle projection 15.

In order to introduce metered amounts of detergent into washing chamber 103 of dishwasher 100, a metering chamber is provided, which may either form part of housing 11 or part of supply container 13. The metering chamber is divided into two sections, namely a first section, called metering space, and a second section, called dispensing channel. The dispensing channel terminates in a dispensing opening which is in fluid connection with dispensing outlet 21.

The metering space and the dispensing channel are in fluid connection with one another, the fluid connection being narrowed by a dispensing barrier, so that an overall labyrinth-like metering chamber is formed.

During normal use, with supply container 13 inserted in carrier unit 14, a dispensing operation is performed as follows: Supply container 13 is rotated 360 degrees about the axis of rotation defined by axle projection 15 by means of motor-driven carrier unit 14. In response to this rotation, detergent stored in supply container 13 is conveyed into the metering chamber. However, due to the dispensing barrier, only the metering space is filled, and thus the metering chamber is only partially filled. In any case, the dispensing barrier ensures that the dispensing channel initially remains free of detergent. The portioned amount of detergent is determined by the volume provided by the metering space.

As the rotation continues, the supply container comes into a position in which the transfer opening to the metering chamber is located above the pouring level of the detergent stored in the supply container, so that no more detergent flows into the metering space of the metering chamber. When the supply container 13 is in this rotational position, the detergent previously introduced into the metering space can flow past the dispensing barrier into the dispensing channel. From there it passes through the dispensing opening of the metering chamber into treatment chamber 103.

In order to reliably prevent unwanted ingress of liquid into dispensing device 6 and, in particular, into the detergent held in the supply container, housing cover 7 serves to close loading aperture 12 in a fluid-tight manner. To this end, in accordance with the present invention, housing cover 7 includes a cover member 8 providing for fluid-tight closure of loading aperture 12 and a locking member 9 movably attached to cover member 8, locking member 9 being equipped with a plurality of locking elements 16, each cooperating with a respective locking finger 17 disposed on housing 11. This is apparent, in particular, when viewing FIGS. 4 through 9 together.

In the exemplary embodiment shown, cover member 8 is circular in shape and made of a transparent plastic material. In the closed position of housing cover 7, cover member 8 rests on the edge of loading aperture 12, which is provided with a seal 18, so that a fluid-tight engagement of cover member 8 is achieved.

Figure 4:
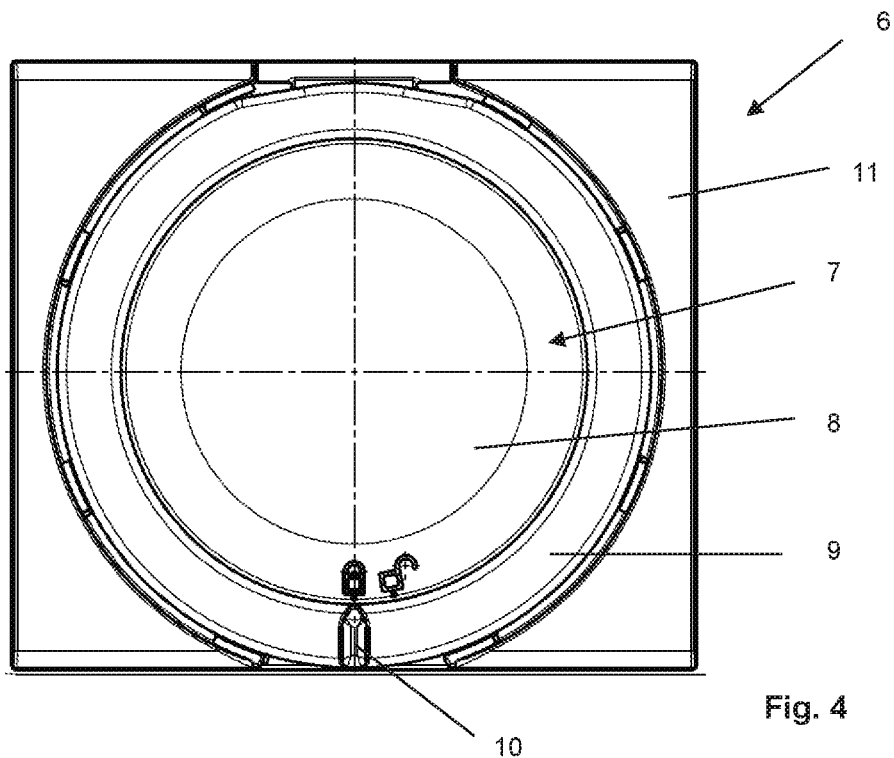
FIG. 4 is a schematic detail plan view showing a dispensing device according to the present invention from above, with a housing cover in a locked position.
Figure 5:
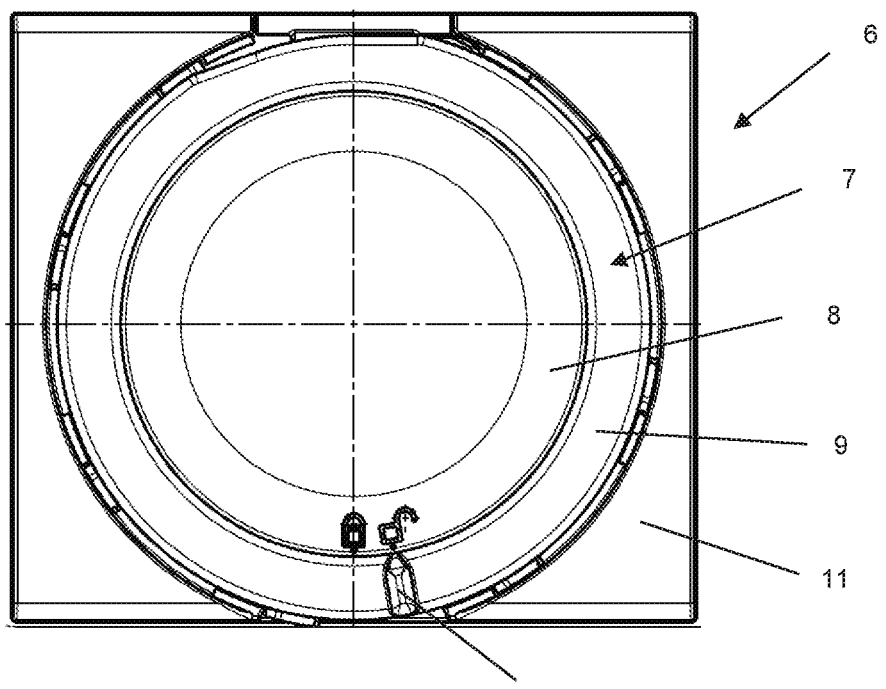
FIG. 5 is a schematic detail plan view showing a dispensing device according to the present invention from above, with a housing cover in an unlocked locked position.

In the exemplary embodiment shown, locking member 9 is designed as a bayonet ring captively connected to cover member 8. With respect to the drawing plane of FIGS. 4 and 5, locking member 9 is rotatable relative to cover member 8 and can assume a locked position, as shown in FIG. 4, and an unlocked position, as shown in FIG. 5. To permit a user to initiate a rotational movement of locking member 9, the locking member is provided with a handle 10. As can be seen when viewing FIGS. 2, 4 and 5 together, cover member 8 is provided with symbols which indicate to the user, by the position of handle 10, whether locking member 9, and thus housing cover 7, is in the locked position or the unlocked position.

Locking member 9 has locking elements 16 which cooperate with locking fingers 17 disposed on housing 11, in each case in the manner of a bayonet lock. In this manner, it is achieved that during movement of locking member 9 from the unlocked position to the locked position, cover member 8 captively connected to locking member 9 is pressed against seal 18 provided by housing 11, thereby reliably closing loading aperture 12 in a fluid-tight manner. The bayonet connection further ensures that locking member 9 cannot be accidentally released as a result of, for example, shaking caused by the action of mechanical forces.

Figure 9:
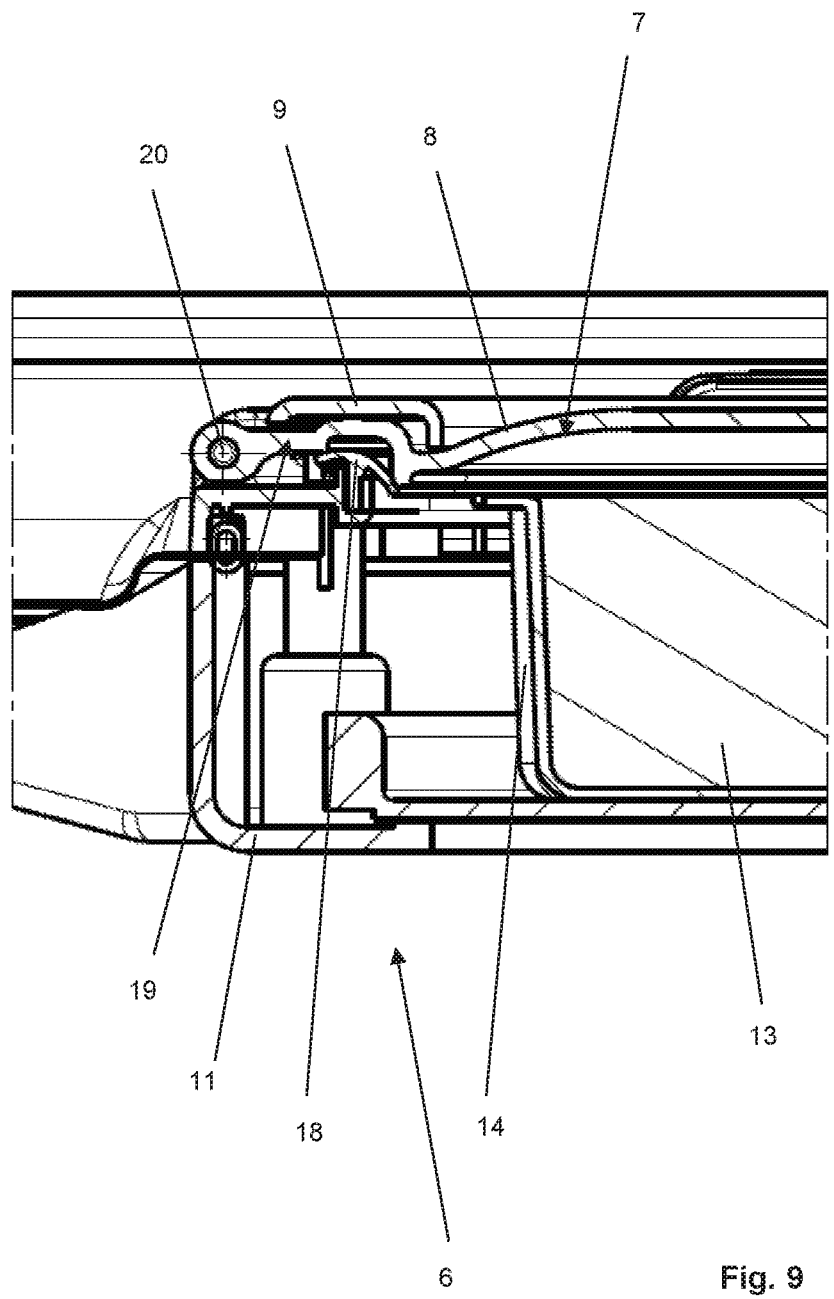
FIG. 9 is a schematic cross-sectional detail view of a dispensing device according to the present invention.

As can be seen particularly from the view of FIG. 9, housing cover 7 is hinged to housing 11. Housing cover 7 can be rotationally pivoted about axis of rotation 20. The hinged attachment of housing cover 7 to housing 11 is via cover member 8, as can also be seen from FIG. 9.

Because of the hinged attachment of housing cover 7, it can be pivoted to an open position, as shown in FIG. 3, or to a closed position, as can be seen, for example, in FIG. 2.

Figure 7:
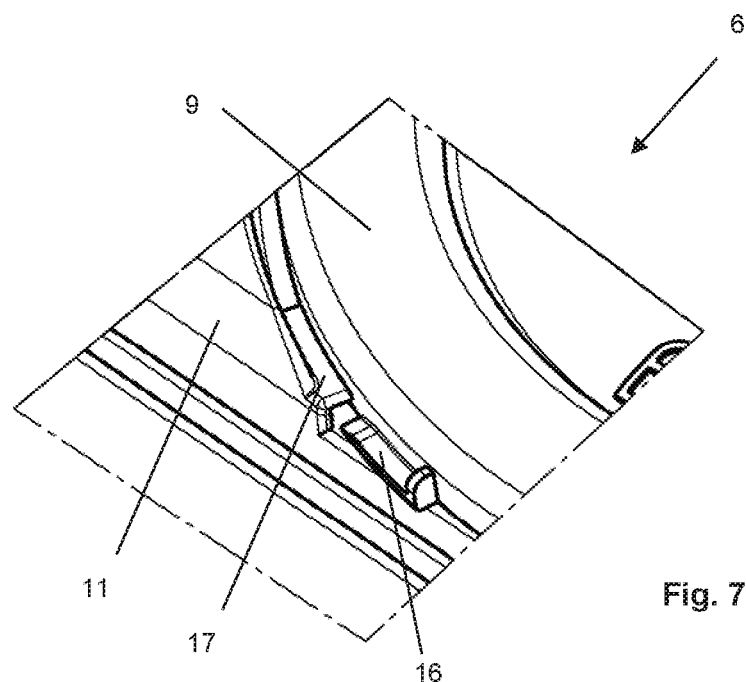
FIG. 7 is a schematic perspective detail view showing a dispensing device according to the present invention with the housing cover in an unlocked position.
Figure 8:
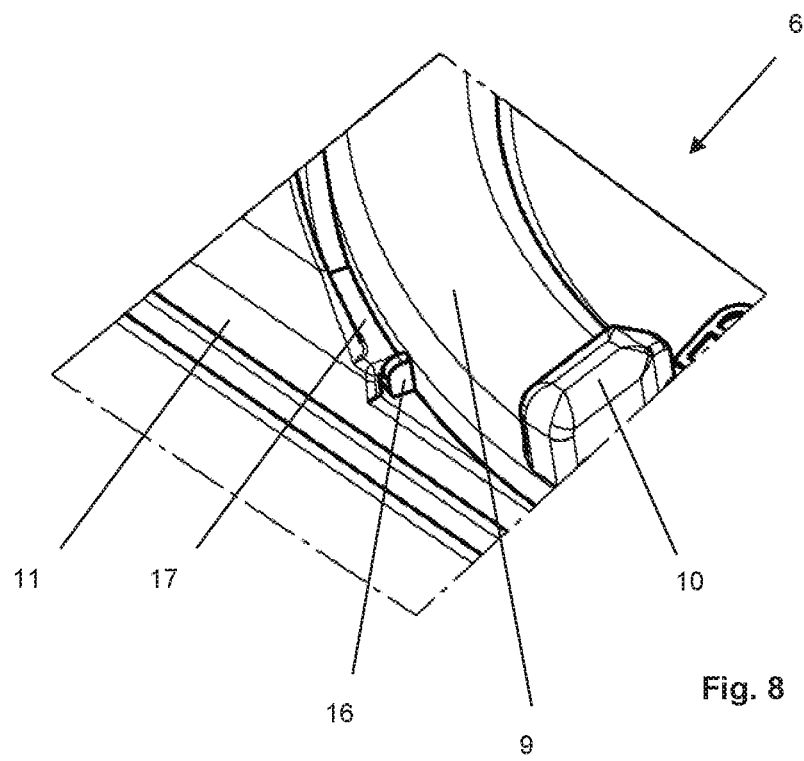
FIG. 8 is a schematic perspective detail view showing a dispensing device according to the present invention with the housing cover in a locked position.

In the closed position of housing cover 7, locking member 9 can be moved from its unlocked position, shown, for example, in FIG. 5 or 7, to its locked position, shown, for example, in FIG. 4 or 8. In this locked position, cover member 7 engages in a fluid-tight manner on the rim surrounding the loading aperture, with seal 18 interposed therebetween, as a result of which loading aperture 12 is closed in a fluid-tight manner.

In order to connect locking member 9 captively to cover 8, cover member 8 has a circumferential groove, as can be seen at end portion 19 of cover member 8, which is illustrated, by way of example, in FIG. 9 In order to provide reliable sealing, seal 18 is formed with two lips, each being associated with one of the legs of the circumferential groove.

Figure 10:
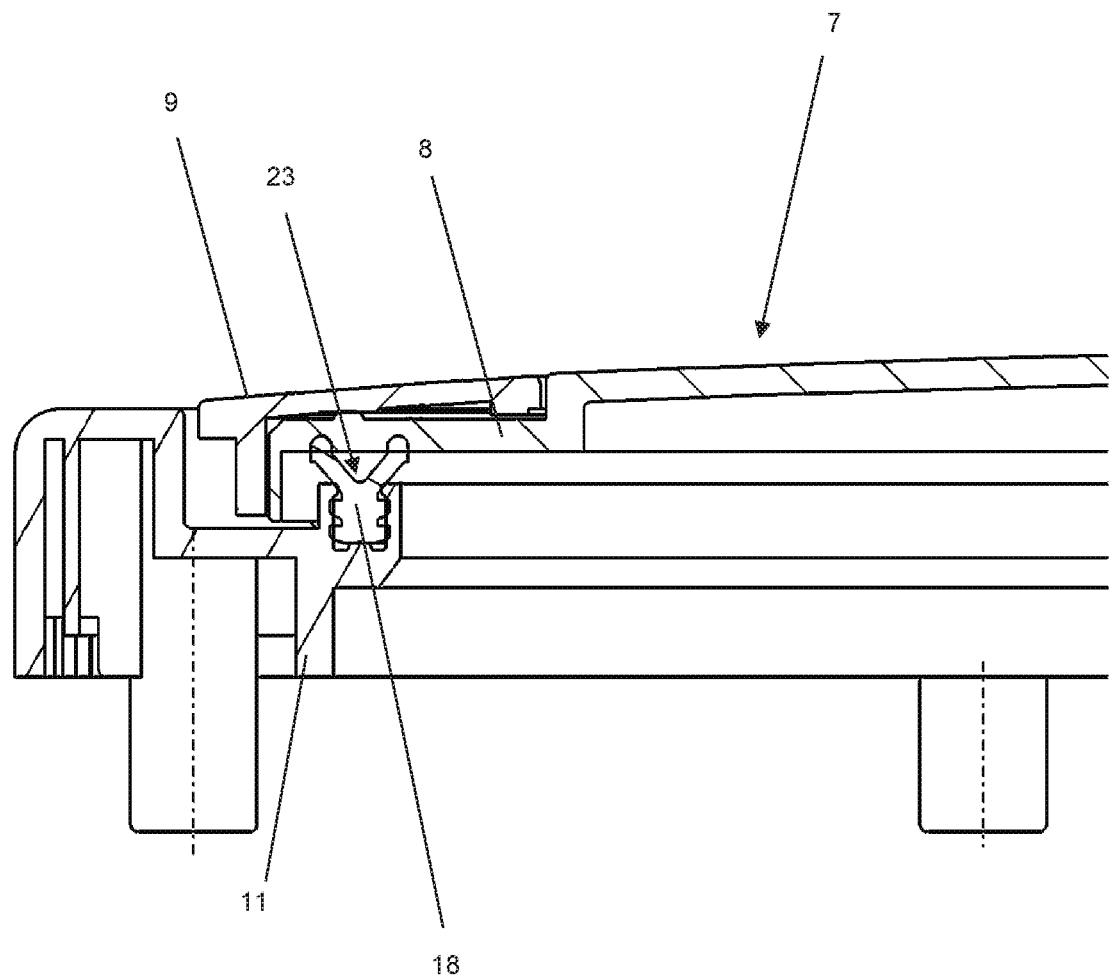
FIG. 10 is a schematic cross-sectional detail view of a dispensing device according to another exemplary embodiment.
Figure 11:
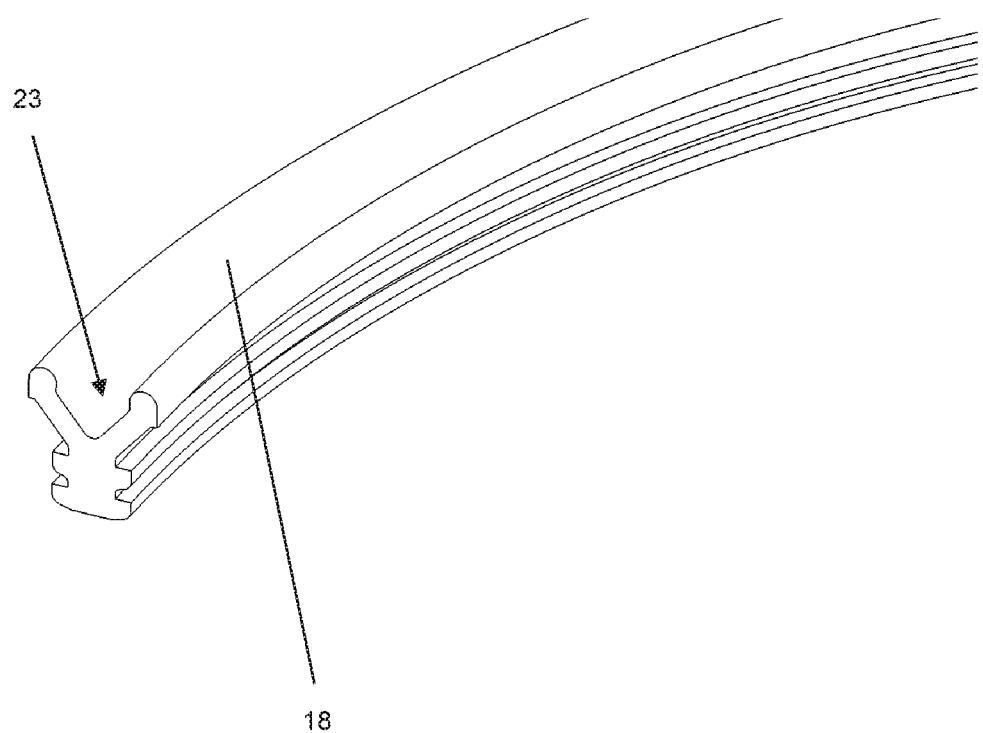
FIG. 11 is a schematic cross-sectional detail view of the seal shown in FIG. 10.

An alternative to the embodiment shown in FIG. 9 is depicted in FIG. 10. Here, seal 18, which is provided by housing 11 and against which cover member 8 is pressed when locking member 9 is in the locked position in order to close loading aperture 12 in a fluid-tight manner, is also formed with two lips or tracks. However, seal 18 is shaped like a Y, so that a sealing channel 23 is formed between the two sealing lips facing cover member 8. In this manner, sealing is further improved, providing increased long-term stability as well as an enhanced sealing effect in the presence of contamination, because particles falling on the sealing track may slide down into the channel. FIG. 11 shows seal 18 separately in a schematic cross-sectional detail view.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 washing chamber door
2 inner side
3 combination device
4 rinse aid reservoir
5 supply container
6 dispensing device
7 housing cover
8 cover member
9 locking member
10 handle
11 housing
12 loading aperture
13 supply container
14 carrier unit
15 axle projection
16 locking element
17 locking finger
18 seal
19 end portion
20 axis of rotation
21 dispensing outlet
22 cover
23 sealing channel
100 dishwasher
101 housing
102 washing tub
103 washing chamber
104 loading opening
105 spray device
106 spray arm
107 spray arm

What is claimed is:

1. A dispensing device for introducing a pourable detergent in metered amounts into a treatment chamber of a program-controlled cleaning appliance, the dispensing device comprising:
   a housing provided with a loading aperture;
   a carrier unit rotatably mounted in the housing and accessible via the loading aperture and which is configured to replaceably receive a supply container for holding the detergent; and
   a housing cover configured to provide fluid-tight closure of the loading aperture, the housing cover including a cover member providing the fluid-tight closure of the loading aperture and an annular locking member rotatably attached to the cover member, the annular locking member including a plurality of locking elements, each cooperating with a respective locking finger disposed on the housing so as to lock the annular locking member by a rotation of the annular locking member about said cover member.

2. The dispensing device as recited in claim 1, wherein the housing cover is hinged.

3. The dispensing device as recited in claim 1, wherein the cover member is circular in shape.

4. The dispensing device as recited in claim 1, wherein the locking member surrounds the cover member annularly.

5. The dispensing device as recited in claim 1, wherein the cover member is at least one of at least partially transparent or semi-transparent.

6. The dispensing device as recited in claim 1, wherein the cover member is made of plastic.

7. The dispensing device as recited in claim 1, wherein the cover member is configured to cooperate with a seal disposed on the housing.

8. The dispensing device as recited in the claim 7, wherein the seal comprises two lips.

9. The dispensing device as recited in claim 1, wherein at least one of the cooperating locking element/locking finger comprises a bayonet lock.

10. The dispensing device as recited in the claim 8, wherein the two lips are in the shape of a Y.

11. A dispensing device for introducing a pourable detergent in metered amounts into a treatment chamber of a program-controlled cleaning appliance, the dispensing device comprising:
   a housing provided with a loading aperture;
   a carrier unit rotatably mounted in the housing and accessible via the loading aperture and which is configured to replaceably receive a supply container for holding the detergent; and
   a housing cover configured to provide fluid-tight closure of the loading aperture, the housing cover including a cover member providing the fluid-tight closure of the loading aperture and a locking member movably attached to the cover member, the locking member including a plurality of locking elements, each cooperating with a respective locking finger disposed on the housing,
   wherein the cover member is at least one of at least partially transparent or semi-transparent.

12. A dispensing device for introducing a pourable detergent in metered amounts into a treatment chamber of a program-controlled cleaning appliance, the dispensing device comprising:
   a housing provided with a loading aperture;
   a carrier unit rotatably mounted in the housing and accessible via the loading aperture and which is configured to replaceably receive a supply container for holding the detergent; and
   a housing cover configured to provide fluid-tight closure of the loading aperture, the housing cover including a cover member providing the fluid-tight closure of the loading aperture and a locking member movably attached to the cover member, the locking member including a plurality of locking elements, each cooperating with a respective locking finger disposed on the housing,
   wherein the cover member is configured to cooperate with a seal disposed on the housing.

13. The dispensing device as recited in the claim 12, wherein the seal comprises two lips.

14. The dispensing device as recited in the claim 13, wherein the two lips are in the shape of a Y.

* * * * *